July 19, 1938.  M. BOETTCHER  2,124,228
AIR INLET DEVICE FOR INTERNAL COMBUSTION ENGINES
Filed March 1, 1937

INVENTOR.
Magnus Boettcher
BY
Morsell Lieber & Morsell
ATTORNEYS.

Patented July 19, 1938

2,124,228

UNITED STATES PATENT OFFICE 2,124,228

AIR INLET DEVICE FOR INTERNAL COMBUSTION ENGINES

Magnus Boettcher, Milwaukee, Wis.

Application March 1, 1937, Serial No. 128,375

2 Claims. (Cl. 123—124)

This invention relates to improvements in air inlet devices for internal combustion engines.

Heretofore, various devices have been proposed for admitting additional air to the intake manifold of an internal combustion engine, which devices are designed to prevent waste of fuel and to increase the economy and efficiency of operation of the motor. These prior devices have all been positioned directly in the intake manifold thereby necessitating either the use of a specially constructed manifold pipe, the drilling of special openings therein, or disconnecting of the manifold from the carburetor extension to permit insertion of a relatively complicated air inlet device therebetween. The majority of these prior devices have in addition been provided with variable air controls which do not function effectively until after the motor has attained a predetermined running speed.

It is a general object of the present invention to provide an improved air inlet device which is of simple construction and which may be readily installed by any automobile user in a few minutes' time.

A more specific object of the present invention is to provide an air inlet device especially designed for quick connection in the vacuum line leading to the windshield wiper motor.

A further object of the invention is to provide an air inlet device for connection in the vacuum line leading to the windshield wiper motor which is so formed as not to interfere with the operation of the windshield wiper.

A still further object of the invention is to provide a device of the class described so constructed as to increase operating economy by admitting air at all times that the motor is running through an opening of constant effective size, as distinguished from prior devices having variable openings which are effective only when the motor attains a predetermined running speed.

A further specific object of the invention is to provide in a device as above described, means in the path of the admitted air for producing a whirling action of said air to break the latter up before it is introduced into the manifold, thus aiding in the vaporization of the fuel mixture to the end that more complete combustion and maximum fuel economy are obtained.

With the above and other objects in view, the invention consists of the improved air inlet device for internal combustion engines, and all its parts and combinations as set forth in the claims and all equivalents thereof.

In the accompanying drawing in which the same reference numerals designate the same parts in all of the views.

Figure 1:
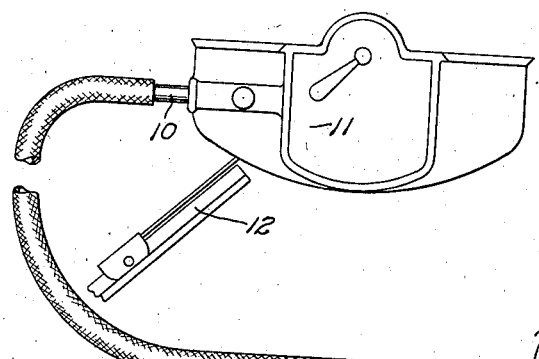
Fig. 1 is an assembly view showing a portion of the intake manifold in longitudinal section, showing the windshield wiper and showing the improved air inlet device connected in the vacuum line for the windshield wiper.

Referring more particularly to the drawing, the numeral 5 designates an intake manifold pipe of an internal combustion engine, the said engine being of any standard form and including the standard carburetor. The intake manifold pipe 5 has one end connected to the carburetor and its other end connected to the motor, and when the motor is running, there is always a vacuum present in the intake manifold pipe, which vacuum serves to draw the fuel mixture into the cylinders.

It is common practice with present-day automobiles to have a threaded opening 6 in the intake manifold pipe for receiving a threaded fitting 7, which fitting usually has a metal tubular extension 8. A length of rubber tubing 9 has one end slipped over the tubular extension 8 and has its other end connected to a similar extension 10 of the windshield wiper motor 11. The suction in the intake manifold is therefore utilized, in all modern automobiles, to operate a suction motor 11 for causing movement of the windshield wiper 12.

Heretofore auxiliary air inlet devices have been formed in or connected directly to the intake manifold. In some of these prior devices special holes had to be drilled in the intake manifold; in others the intake manifold had to be specially formed; and in still others the device was insertable between the intake manifold and the carburetor extension. With all these prior devices, therefore, installation was expensive and required the services of an expert.

Figure 2:
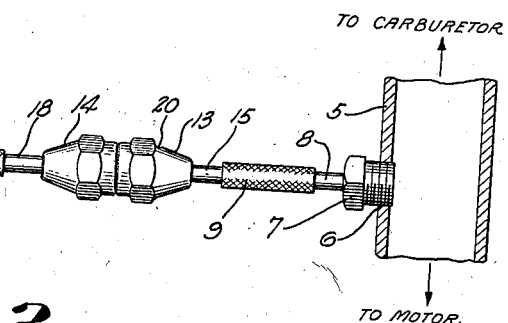
Fig. 2 is an enlarged longitudinal sectional view through a portion of the windshield wiper vacuum line illustrating the interior construction of the air inlet device.

It is an object of the present invention to provide an air inlet device which is readily insertable in the tubular vacuum line leading to the windshield wiper to form a part of said line, whereby additional air may be thus admitted to the manifold. Referring more particularly to Fig. 2, the device consists preferably of a two-part fitting comprising the parts 13 and 14. The part 13 has a tubular metal extension 15 projecting from one end thereof and a threaded portion 16 projecting from the other end thereof. The fitting part 14 has one end internally threaded as at 17 to receive the threaded extension 16 of the fitting part 13, and the fitting part 14 has a tubular extension 18 projecting in an opposite direction from the extension 16 on the fitting part 13. When the two fitting parts are threaded together, an internal chamber 19 is formed therein, and one of the fitting parts, preferably the part 13, has a hole 20 drilled through a side wall thereof for the purpose of admitting air from the exterior into the chamber 19. This hole 20 is preferably angled away from the intake manifold as illustrated. The end of the chamber 19 next to the intake manifold may also be fitted with a filtering screen 21 for the purpose of preventing the entrance of dirt or other foreign matter into the intake manifold.

In addition, it is preferred to employ means for breaking up and causing a whirling action on the air admitted through the drilled opening 20. Accordingly a batch of relatively small mesh screening 22 which has been partially crushed is inserted in the chamber 19. This screening is rather loosely crushed so that air may circulate freely therein.

To install the improved device, it is merely necessary to sever the rubber hose 9 at a desired point and to slip one of the severed ends over the fitting extension 18 and the other severed end over the fitting extension 15. Obviously this installation can be effected in a few minutes' time. In those cars having a greater length of metal forming a part of the vacuum line leading to the windshield wiper motor, one of the extensions 15 may be formed with a fitting similar to the fitting 7 for insertion into the intake manifold opening 6 instead of the fitting 7, and the other extension 18 of the air inlet device may be provided with a socket member for the reception of the fitting 7 on the end of the standard windshield wiper vacuum line. Most automobiles have the rubber hose running up close to the manifold as shown in Fig. 1 so that the type of installation shown in Fig. 1 is practical for the majority of cars.

In use when the motor is running, a vacuum will be created in the vacuum line leading to the windshield wiper motor, and inasmuch as the chamber 19 of the air inlet device forms a part of said vacuum line, air will be sucked into the drilled opening 20, which air will strike the mesh of the matted screening 22 and will be thus agitated, whirled and broken up into a plurality of fine streams. This breaking up of the air will result in more perfect vaporization of the mixture and will promote more complete combustion. The air inlet hole 20 is preferably not over one-sixteenth of an inch in diameter, and with this small air opening, it is found that there is no interference with the operation of the windshield wiper motor as the opening is too small to have any great effect upon the amount of suction existing in the windshield wiper line. By having the opening 20 angled away from the intake manifold the suction in the windshield wiper vacuum line does not act in the same direction as the direction of extent of said opening, and therefore the admission of too much air or air at too high a velocity is prevented. It is to be noted that with the present device air is admitted as soon as the motor starts running, but that said air automatically proportions itself to operating conditions due to the fact that the greater the suction, the greater the amount of admitted air.

Figure 3:
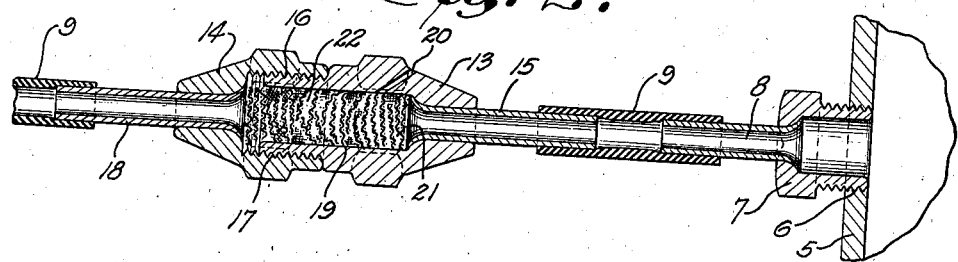
Fig. 3 is a longitudinal sectional view of a modified form of device.
Figure 4:
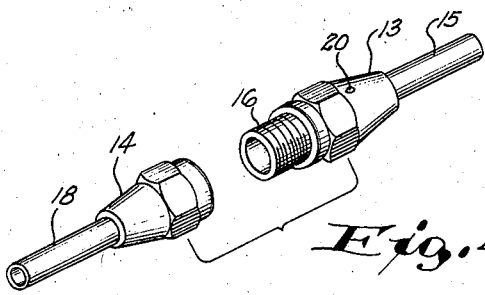
Fig. 4 is a perspective view of the improved device showing the two parts thereof separated.

In Fig. 3 a modified form of the invention is disclosed wherein, in place of the crushed wire screening 20 other means is employed for breaking up the admitted air. In this form of the invention a coil spring 23 extends longitudinally of the chamber 19, and said spring is adapted to produce a whirling action on the admitted air. In addition said spring may cooperate with a ball valve 24, which valve is urged to substantially sealing position by the spring when the motor is not operating. The spring, however, is so light that as soon as there is any vacuum present in the line, the ball 24 will be drawn to open position, and air admitted through the air inlet 20 will be directed toward the ball 24 and then out toward the manifold, while being agitated by the convolutions of the spring 23. The ball 24 tends to automatically produce a balanced vacuum condition on both sides thereof so that there will be a proper amount of vacuum condition for operating the windshield wiper and a proper amount for causing the admission of air through the air inlet 20.

Either of the forms of the invention may also be constructed with an overhanging exterior baffle 24 to prevent grease from caking over the air inlet opening 20.

It is to be understood that the broad aspect of the present invention consists in the idea of providing an air inlet device which is of more simple construction than the usual device of this nature and which may be installed by connection directly in the vacuum line leading to the windshield wiper motor. Various changes and modifications in the exact method of installation may be devised by those skilled in the art, and all of such changes are contemplated as may come within the scope of the claims.

What I claim is:

1. An air inlet device for internal combustion engines having a tubular vacuum line leading from the intake manifold to the windshield wiper motor or other auxiliary device comprising a small tubular fitting having tubular connecting extensions projecting from opposite ends thereof and in substantial alinement with each other and with the axis of the fitting, said extensions providing for quick connection of the fitting in said vacuum line to be supported solely thereby from each end of the fitting, there being an air inlet opening communicating with the fitting between said alined connecting extensions, and means for agitating the admitted air.

2. An air inlet device for internal combustion engines having a tubular vacuum line leading from the intake manifold to the windshield wiper motor or other auxiliary device comprising a small tubular fitting having tubular connecting extensions projecting from opposite ends thereof and in substantial alinement with each other and with the axis of the fitting, said extensions providing for quick connection of the fitting in said vacuum line to be supported solely thereby from each end of the fitting, there being an air inlet opening communicating with the fitting between said alined connecting extensions, a ball valve in said fitting, and a spring normally urging said ball toward the end of the fitting away from the air inlet, said ball tending to produce a balanced vacuum condition in the fitting.

MAGNUS BOETTCHER.